United States Patent
Sin et al.

(10) Patent No.: US 7,911,735 B1
(45) Date of Patent: Mar. 22, 2011

(54) PERPENDICULAR MAGNETIC RECORDING HEAD UTILIZING A NONMAGNETIC UNDERLAYER LAYER

(75) Inventors: Kyusik Sin, Pleasanton, CA (US); Mun Hyoun Park, Fremont, CA (US); Honglin Zhu, Fremont, CA (US); Christopher T. Ngo, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 952 days.

(21) Appl. No.: 11/716,346

(22) Filed: Mar. 9, 2007

(51) Int. Cl.
*G11B 5/147* (2006.01)
*H04R 31/00* (2006.01)

(52) U.S. Cl. ............ 360/119.02; 360/125.09; 29/603.12
(58) Field of Classification Search ............. 360/119.01, 360/119.02, 119.04, 125.09, 125.08, 119.03; 29/603.12
See application file for complete search history.

(56) References Cited

U.S. PATENT DOCUMENTS

| 6,960,281 | B2 | 11/2005 | Han et al. | 204/192.3 |
| 7,062,838 | B2 | 6/2006 | Ding et al. | 29/603.12 |
| 7,508,627 | B1* | 3/2009 | Zhang et al. | 360/125.12 |
| 2002/0080523 | A1* | 6/2002 | Sato et al. | 360/126 |
| 2006/0008679 | A1 | 1/2006 | Noma | 428/828 |

OTHER PUBLICATIONS

Panasyuk et al, "Magnetically soft powder alloys with high wear resistance", Powder Metallurgy and Metal Ceramics v. 36 p. 604-608 (Ukraine: 1998) (abstract).*
Patton et al, Wear v. 202 No. 1 p. 99-109, Elsevier (Columbus, OH: Dec. 30, 1996) (abstract).*
Radeloff, Conference on Magnetic Materials and Components in Communications Engineering and Data Transmission, NTG-Fachberichte v. 76 p. 31-37 (West Germany: Apr. 16-18, 1980) (abstract).*
Coutu et al, Journal of Magnetism and Magnetic Materials vol. 215-216 p. 237-239 (2000).*

\* cited by examiner

*Primary Examiner* — Julie Anne Watko (57) ABSTRACT

The method and system for providing a perpendicular magnetic recording (PMR) head are described. The PMR head includes a base layer, a nonmagnetic metal underlayer on the base layer, and a PMR pole on the nonmagnetic metal underlayer. The PMR pole has a top that is wider than its bottom. The base layer has a first hardness with respect to a pole trim. The nonmagnetic metal underlayer has a second hardness with respect to the pole trim. The second hardness is less than the first hardness.

25 Claims, 8 Drawing Sheets

PERPENDICULAR MAGNETIC RECORDING HEAD UTILIZING A NONMAGNETIC UNDERLAYER LAYER

BACKGROUND

Figure 1:
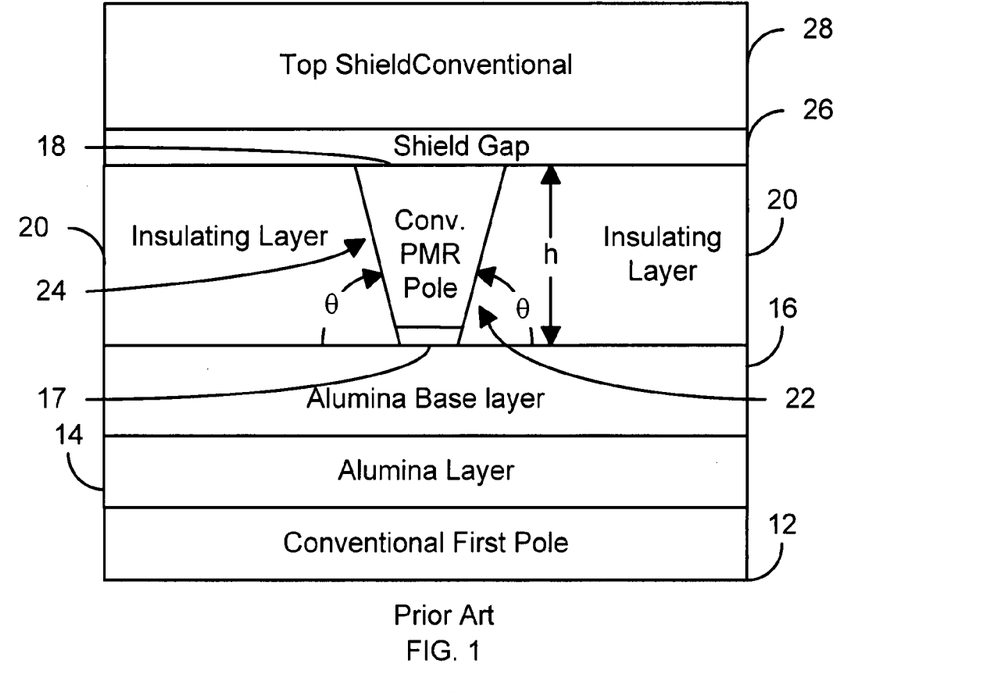
FIG. 1 is an ABS-view of a conventional PMR head.
Figure 2:
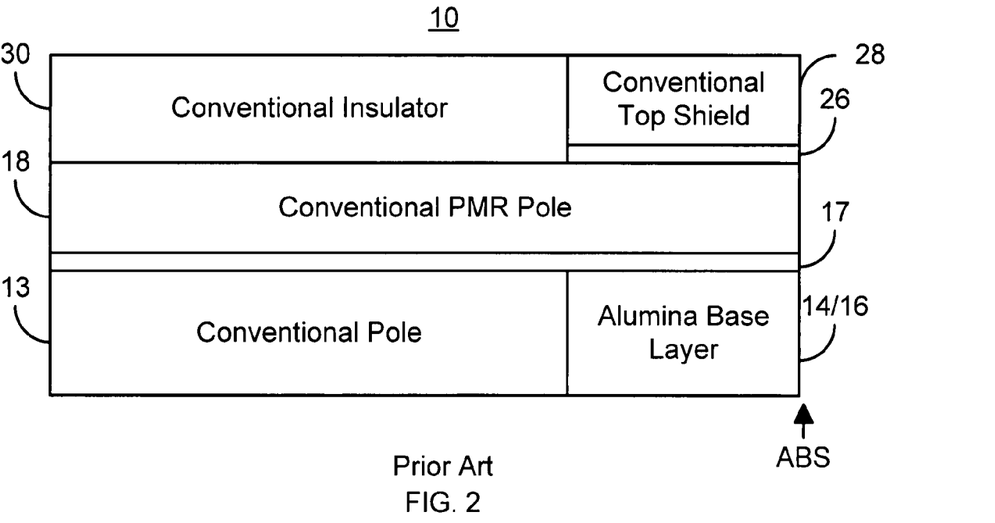
FIG. 2 is a side view of a conventional PMR head.

FIGS. 1-2 depict a portion of conventional head including a conventional perpendicular magnetic recording (PMR) head 10. FIG. 1 depicts the conventional PMR head 10 as viewed from the air-bearing surface (ABS), while FIG. 2 depicts the conventional PMR head 10 as viewed from the side. For clarity, the conventional PMR head 10 is not drawn to scale. The conventional PMR head 10 includes a conventional first pole 12, pole/flux guide 13, alumina insulating layer 14, alumina base layer 16 that may be considered part of the alumina insulating layer 14, a magnetic underlayer layer 17, a conventional PMR pole 18, insulating layer 20, shield gap 26, top shield 28, and insulating layer 30. Note that in certain other embodiments, the top shield 28 may also act as pole during writing using the conventional PMR head 10. The magnetic underlayer 17 is used as a seed layer for the magnetic material(s) in the conventional PMR pole 18. The conventional PMR pole 18 and the top shield 28 are surrounded by insulating layers 20 and 30. The conventional PMR pole 18 has sidewalls 22 and 24. The conventional PMR pole 18 also has a negative angle such that the top of the conventional PMR pole 18 is wider than the bottom of the conventional PMR pole 18. Stated differently, the angle θ of the sidewalls is less than ninety degrees in the conventional PMR pole 18.

Figure 3:
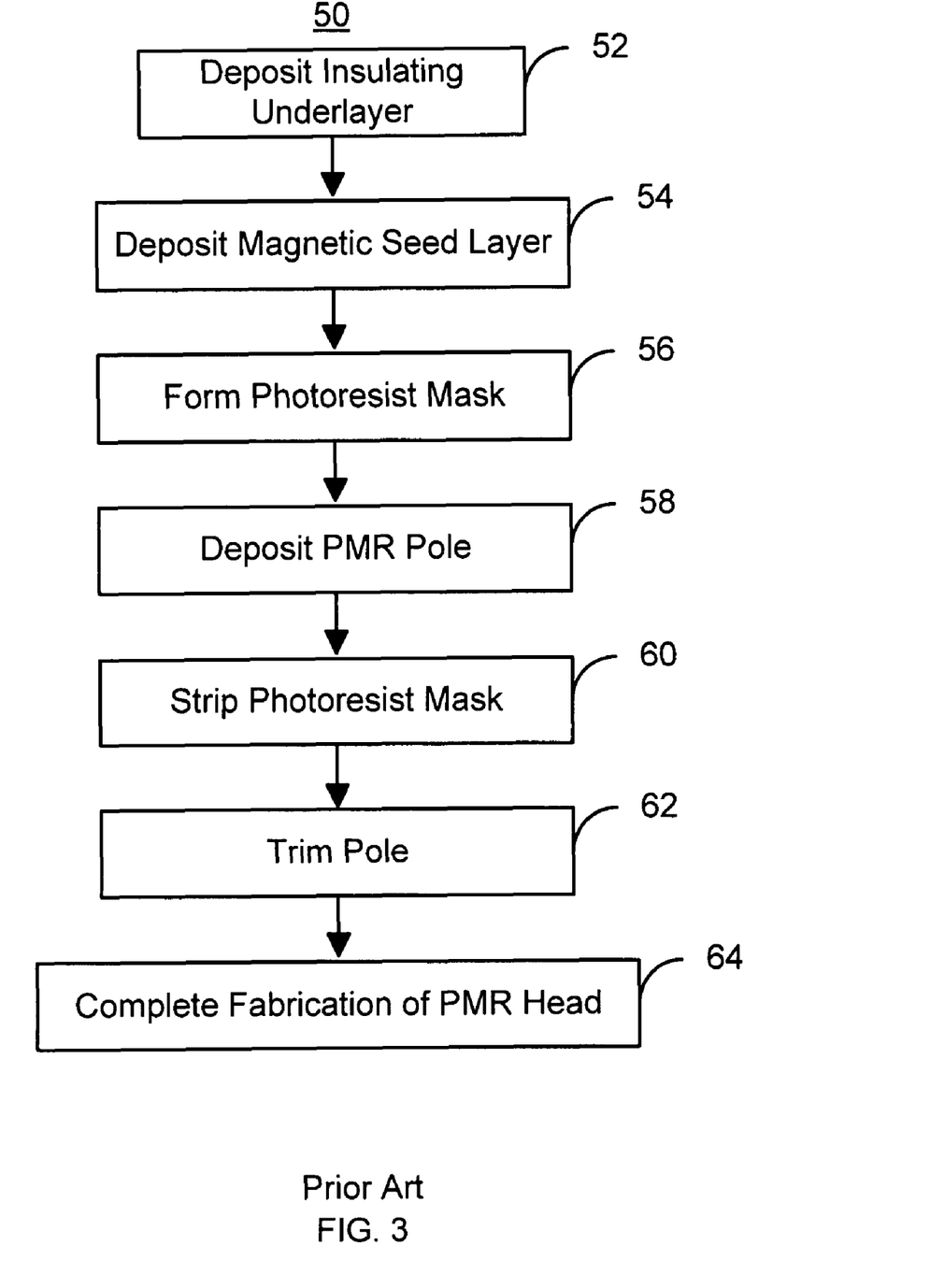
FIG. 3 is a flow chart depicting a conventional method for fabricating a conventional PMR head.

FIG. 3 is a flow chart depicting a conventional method 50 for fabricating the conventional PMR head 10 using a damascene process. For simplicity, some steps are omitted. The conventional method 50 is described in the context of the conventional PMR head 10. The conventional method 50 starts after formation of the first pole 12 and the alumina layer 14. The alumina base layer 16 is formed, via step 52. Thus, the insulating layers 14 and 16 may be part of a single, larger insulating layer. The magnetic underlayer 17 that is used as a seed layer is deposited, via step 54. A photoresist mask is formed, via step 56. The mask is typically a photoresist mask having a trench that is substantially the same shape as the conventional PMR pole 18. The trench is refilled using the material for the conventional PMR pole 18, via step 58. The mask formed in step 56 is removed, via step 60. The PMR pole 18 is trimmed, via step 62. Typically, step 62 is performed using an ion beam etch that is carried out at an angle. In addition to thinning the PMR pole 18, the trim performed in step 62 removes any remaining magnetic underlayer 17 outside of the PMR pole 18. Fabrication of the PMR head 1 is then completed, via step 64. Step 64 may include formation of the insulating layer 20, lapping of the conventional PMR pole 18 to define the pole thickness, formation of the shield gap 25, and other processes.

Figure 4:
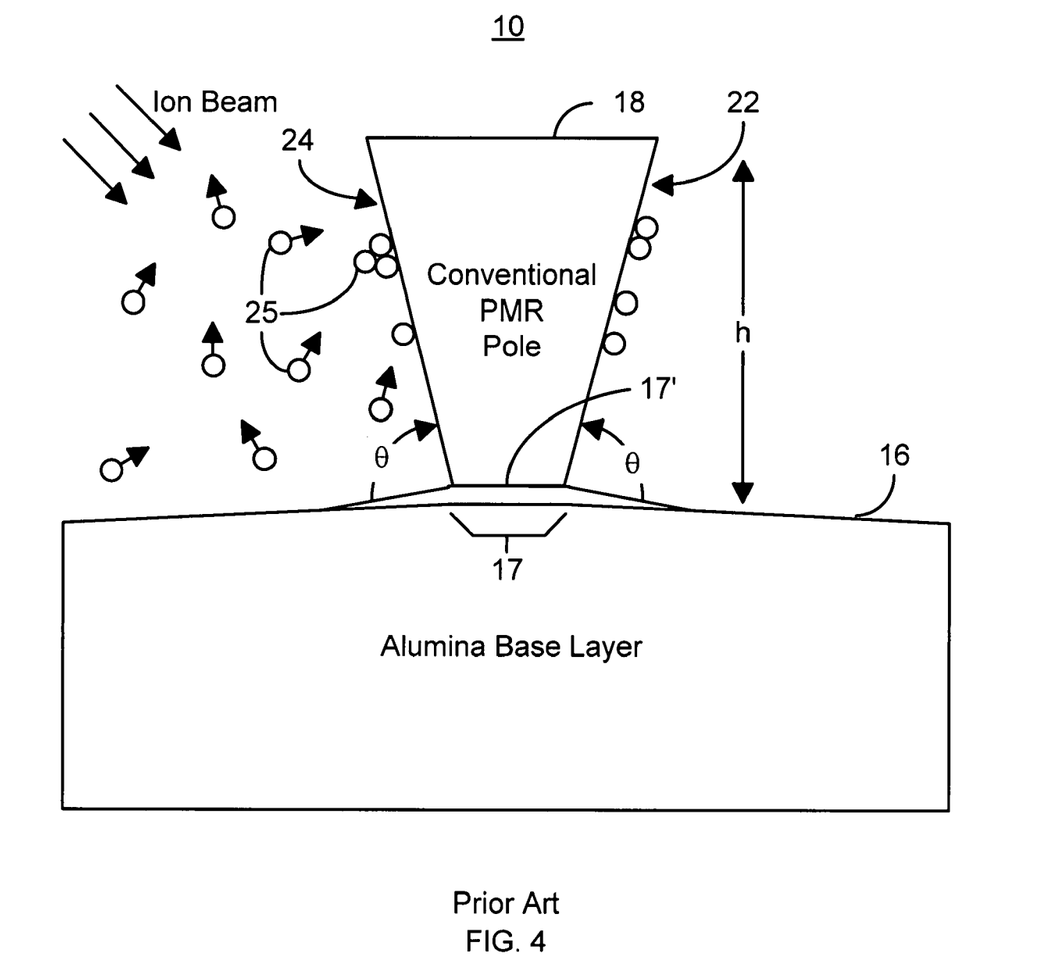
FIG. 4 is a diagram of a conventional PMR head during fabrication.

Although the conventional method 50 may be used to fabricate the conventional PMR pole 18, there are drawbacks. For example, FIG. 4 depicts the conventional PMR head 10 during the trimming performed in step 60. At the end of the trimming in step 60, only the portion 17 of the magnetic underlayer 17' should remain. Thus, the conventional PMR head 10 is typically over etched. At least some of the alumna base layer 16 is, therefore, etched during the pole trim in step 60. As can be seen in FIG. 4, atoms 25 removed from the alumina base layer 16, magnetic underlayer 17, and/or the PMR pole 18 may redeposit on the PMR pole 18. Some of these atoms 25 are redeposited on the sidewalls 22 and 24 of the conventional PMR pole 18. This redeposition is typically not a controlled process. Because of the redeposition on the PMR pole 18, the etch rate of the PMR pole 18 varies with time and location. As redeposition continues, the etch rate of the PMR pole 18 dynamically changes. Consequently, the width of the conventional PMR pole 18 may vary in an unpredictable manner. As a result, there may be variations in the track width of the conventional PMR head 10. In addition, the angle, θ, of the sidewalls 22 and 24 may vary. Such variations between conventional PMR poles 18 are undesirable. Furthermore, the surface roughness or profile of the sidewalls 22 and 24 may also vary due to redeposition. Consequently, geometry of the conventional PMR pole 18 may be compromised. As a result, the performance of the conventional PMR head 10 may be degraded.

Accordingly, what is needed is an improved method for fabricating a PMR head.

SUMMARY

The method and system for providing a PMR head are described. The PMR head includes a base layer, a nonmagnetic metal underlayer on the base layer, and a PMR pole on the nonmagnetic metal underlayer. The PMR pole has a top that is wider than its bottom. The base layer has a first hardness with respect to a pole trim. The nonmagnetic metal underlayer has a second hardness with respect to the pole trim. The second hardness is less than the first hardness.

DETAILED DESCRIPTION OF THE PREFERRED EMBODIMENTS

Figure 5:
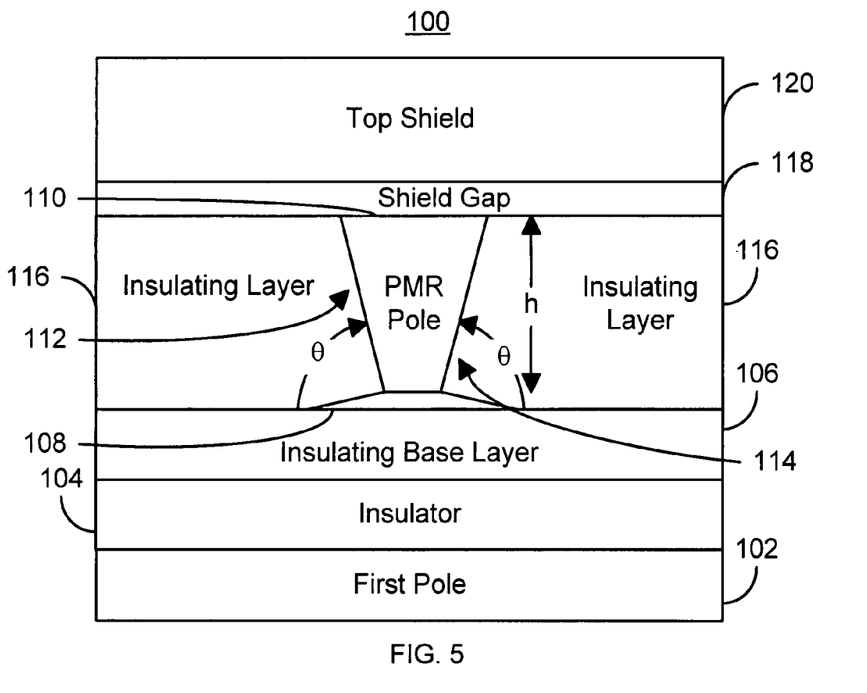
FIG. 5 is an exemplary embodiment of a PMR head, as viewed from the ABS
Figure 6:
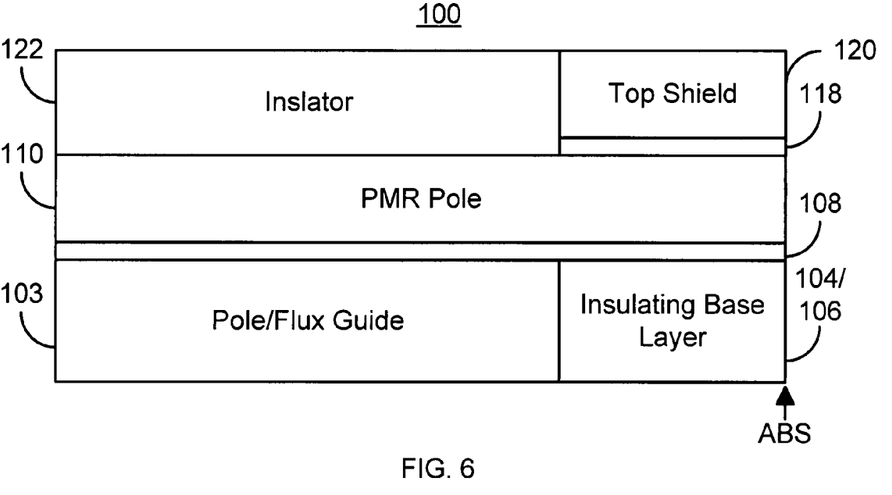
FIG. 6 is an exemplary embodiment of a PMR head, as viewed from the side.

FIGS. 5-6 depict an exemplary embodiment of a PMR head 100. FIG. 5 is an ABS view of the PMR head 100, while FIG. 6 is a side view of the PMR head 100. In addition, for clarity, the PMR head 100 is not drawn to scale. The PMR head 100 is preferably part of a merged head that also includes a read head (not shown) and resides on a slider (not shown).

The PMR head 100 includes a first pole 102, pole/flux guide 103, insulator 104, base layer 106, nonmagnetic underlayer 108, PMR pole 110, insulating layer 112, shield gap 118, top shield 120, and insulator 122 behind the top shield 120. The PMR pole 110 and the top shield 120 are surrounded by insulating layers 118 and 122. Note that in certain other embodiments, the top shield 120 may also act as pole during writing using the PMR head 100. In addition, although described in the context of single layers or structures, such as the PMR pole 110 or base layer 106, these structures may include multilayers.

The PMR pole 110 has sidewalls 112 and 114 and is preferably trapezoidal in shape. Thus, the PMR pole 110 also has a negative angle such that the top of the PMR pole 110 is wider than the bottom of the PMR pole 110. Stated differently, the angle θ of the sidewalls is less than ninety degrees in the PMR pole 110. In a preferred embodiment, the angle θ is at least seventy-five degrees and less than ninety degrees.

The base layer 106 is insulating and preferably composed of aluminum oxide. The base layer 106 may, therefore, be considered part of the insulator 104. In addition, the base layer 106 has a particular hardness with respect to a pole trim that may be used in forming the PMR pole 110. Stated differently, a pole trim performed for the PMR pole 110 etches the base layer 106 at a particular rate related to the hardness of the base layer 106.

The nonmagnetic underlayer 108 is preferably metallic and resides on the base layer 104. In addition, the nonmagnetic underlayer 108 functions as a seed layer for the PMR pole 110. For example, the nonmagnetic underlayer 108 may include materials such as one or more of Ru, Ta, NiNb, Ti, and NiCr. In one embodiment, the nonmagnetic underlayer 108 is composed of NiNb. The nonmagnetic underlayer 108 may be sputtered or plated. The nonmagnetic underlayer 108 also a hardness with respect to the pole trim of the PMR pole 110. This hardness of the nonmagnetic underlayer 108 is less than the hardness of the base layer 106. Consequently, the nonmagnetic underlayer 108 may be more rapidly removed by a pole trim than the base layer 106. In one embodiment, the nonmagnetic underlayer 108 has a hardness with respect to the pole trim that is less than the hardness of the base layer 106 but greater than the hardness of the materials used for the PMR pole 110. In another embodiment, the hardness of the nonmagnetic underlayer 108 is approximately the same as or even less than the hardness of the PMR pole 110. Because the nonmagnetic underlayer 108 is, by definition, not magnetic, not all of the nonmagnetic underlayer 108 not covered by the PMR pole 110 must be removed. Thus, as shown in FIG. 5, the nonmagnetic underlayer 108 may have a footing that extends beyond the base of the PMR pole 110. Stated differently, in the PMR head 100, the width of the nonmagnetic underlayer 108 is greater than the width of the base of the PMR pole 110.

Use of the nonmagnetic underlayer 108 may improve performance of the PMR head 100. Because all exposed portions the nonmagnetic underlayer 108 need not be removed during the pole trim, less of the insulating underlayer 108 is exposed during the pole trim. Thus, redeposition of the base layer 106 may be reduced. In addition, because the hardness of the nonmagnetic underlayer 108 is less than base layer 106, and preferably closer to the hardness of the PMR pole 110, redeposition may be reduced. Furthermore, less of the material used for the PMR pole 110 may be consumed during the trim process. Consequently, better control of the geometry of the PMR pole 110, the track width, and the roughness of the sidewalls 112 and 114 may be achieved. In addition, use of a nonmagnetic layer 108 between the pole/flux guide 103 and the PMR (write) pole 110 may reduce domain lockup. Domain lockup is due to a remanent field in a PMR head and may result in the PMR head inadvertently erasing data in the PMR media even though no current energizes the PMR head. Use of the nonmagnetic layer 108 between the pole/flux guide 103 and the PMR pole 110 may improve the ability of the PMR pole 110 to demagnetize and thus may reduce undesirable domain lockup. Thus, performance of the PMR head 100 may be enhanced.

Figure 7:
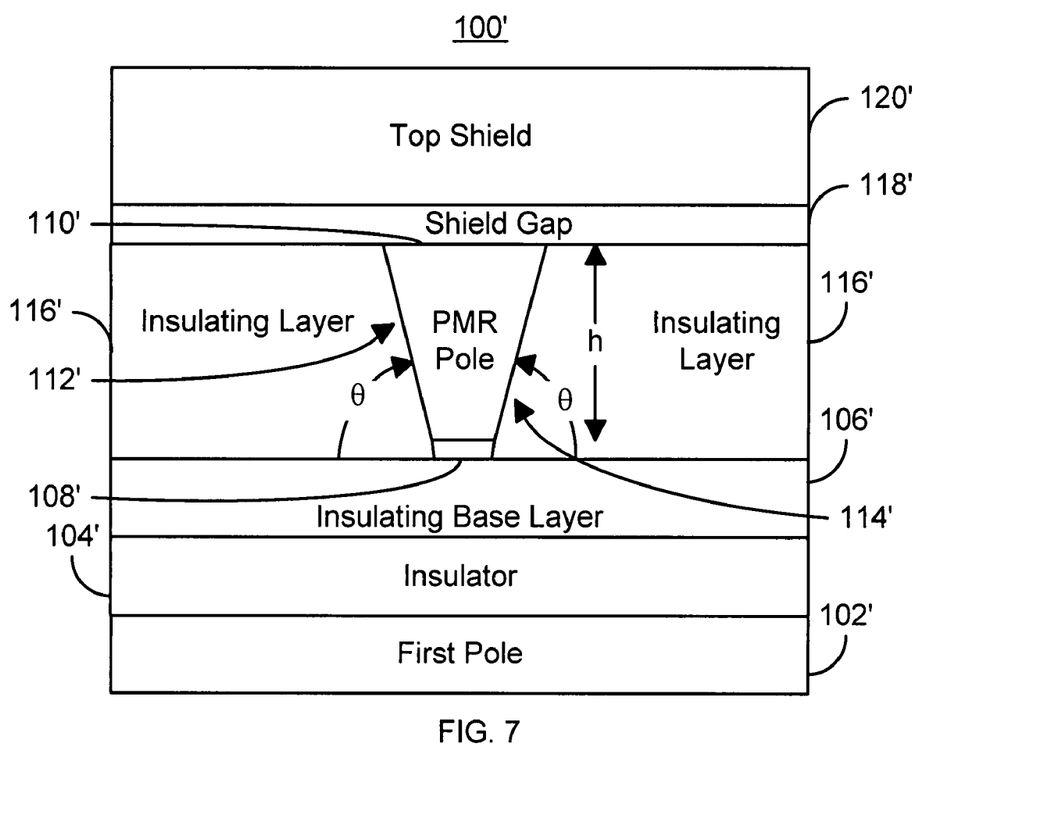
FIG. 7 is another exemplary embodiment of a PMR head, as viewed from the ABS

FIG. 7 is another exemplary embodiment of a PMR head 100', as viewed from the ABS. The PMR head 100' is analogous to the PMR head 100 and thus includes a first pole 102', insulator 104', base layer 106', nonmagnetic underlayer 108', PMR pole 110', insulating layer 112', shield gap 118', top shield 120', and insulator 122' behind the top shield 120'.

Because the nonmagnetic underlayer 108' is analogous to the nonmagnetic underlayer 108, the nonmagnetic underlayer 108 has similar properties. For example, the nonmagnetic underlayer 108' is preferably metallic, resides on the base layer 106', acts as a seed layer for the PMR pole 110' and has a hardness with respect to a trim of the PMR pole 110 that is less than the hardness of the base layer 106'. Consequently, the nonmagnetic underlayer 108' may be more rapidly removed by the pole trim than the base layer 106'. In one embodiment, the nonmagnetic underlayer 108' has a hardness with respect to the pole trim that is less than the hardness of the base layer 106' but greater than the hardness of the materials used for the PMR pole 110'. In another embodiment, the hardness of the nonmagnetic underlayer 108' is approximately the same as or even less than the hardness of the PMR pole 110. For example, the nonmagnetic underlayer 108' may include materials such as one or more of Ru, Ta, NiNb, Ti, and NiCr and may be sputtered or plated.

A portion of the nonmagnetic underlayer 108' may remain outside of the PMR pole 110' substantially without adversely affecting performance of the PMR head 100'. However, in the PMR head 100', this portion of the nonmagnetic underlayer 108' has been removed, preferably during a pole trim step. Consequently, the only remaining nonmagnetic underlayer 108' is under the base of the PMR pole 110'. In the PMR head 100', therefore, the width of the nonmagnetic underlayer 108' is approximately the same as the width of the base of the PMR pole 110'.

Use of the nonmagnetic underlayer 108' may improve performance of the PMR head 100'. Because the hardness of the nonmagnetic underlayer 108' is less than the hardness of the base layer 106', and preferably closer to the hardness of the PMR pole 110, redeposition may be reduced. This may occur even though the portion of the nonmagnetic underlayer 108' exposed by the PMR pole 110' is removed. Consequently, better control of the geometry of the PMR pole 110', the track width, and the roughness of the sidewalls 112' and 114' may be achieved. In addition, use of a nonmagnetic layer 108' between the pole/flux guide (not shown in FIG. 7) and the PMR (write) pole 110' may reduce domain lockup. Thus, performance of the PMR head 100' may be enhanced.

Figure 8:
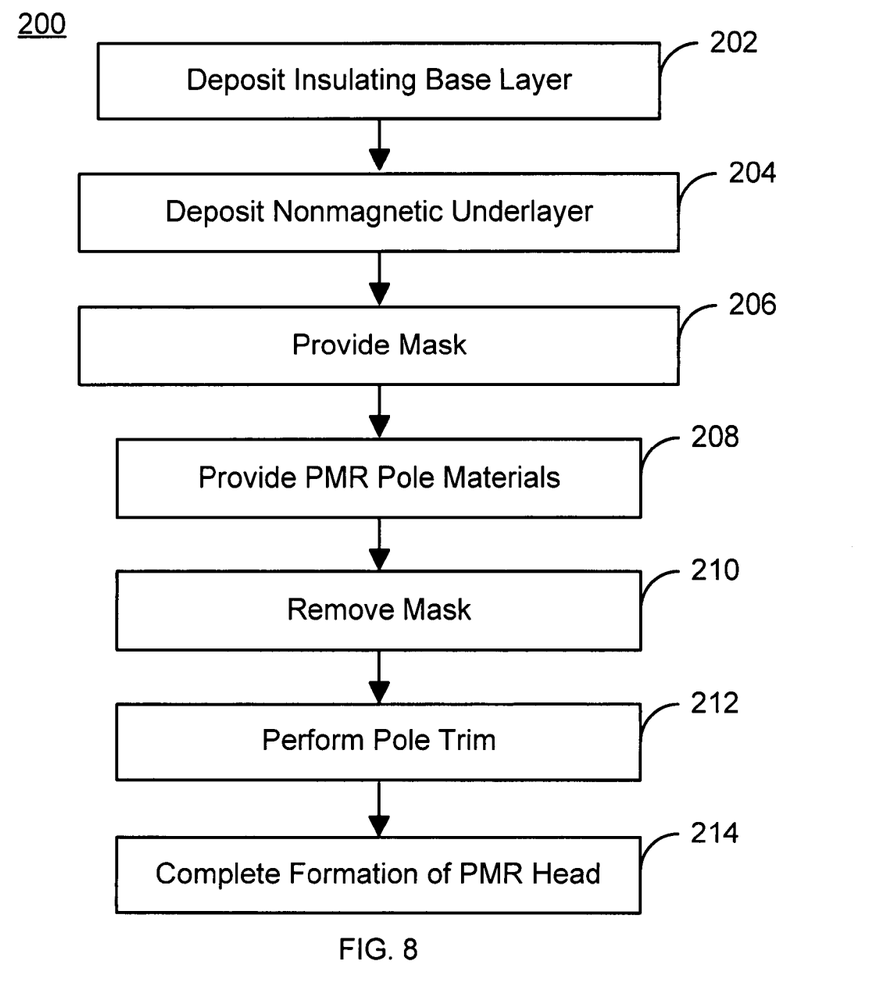
FIG. 8 is a flow chart depicting an exemplary embodiment of a method for forming a PMR head.
Figure 9:
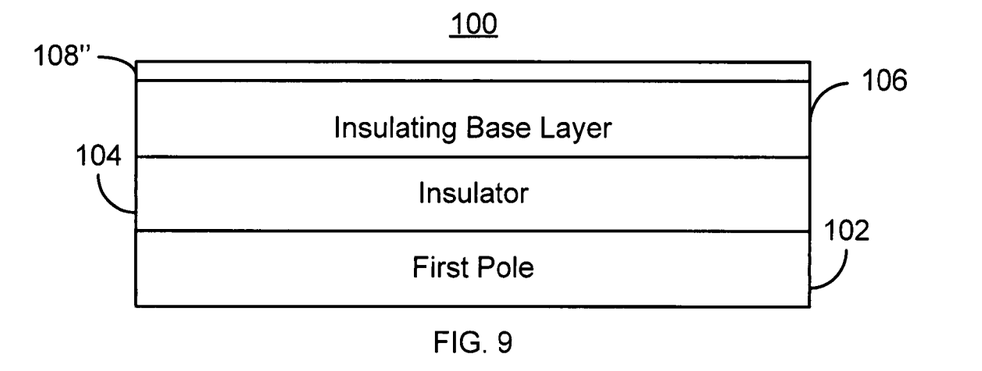
FIGS. 9-12 are diagrams of an exemplary embodiment of a PMR head during fabrication.

FIG. 8 is a flow chart depicting an exemplary embodiment of a method 200 for forming a PMR head. FIGS. 9-12 are diagrams of an exemplary embodiment of the PMR head 100 during fabrication, as viewed from the ABS. For simplicity, some steps are omitted or combined into a single step. The method 200 is described, therefore, in the context of the PMR head 100. The method 200 starts after formation of the first pole 102 and the insulator 104. The insulating base layer 106 is formed, via step 202. Thus, the insulating layers 104 and 106 may be part of a single, larger insulating base layer. The nonmagnetic underlayer 108 is deposited, via step 204. In some embodiments, one or more layers of the nonmagnetic underlayer may be plated or sputtered. Step 204 may thus include depositing one or more of Ru, Ta, NiNb, Ti, and NiCr. FIG. 9 depicts the PMR head 100 after step 204 is performed. Thus, the first pole 102, insulator 104, base layer 106, and nonmagnetic underlayer 108" are shown.

Figure 10:
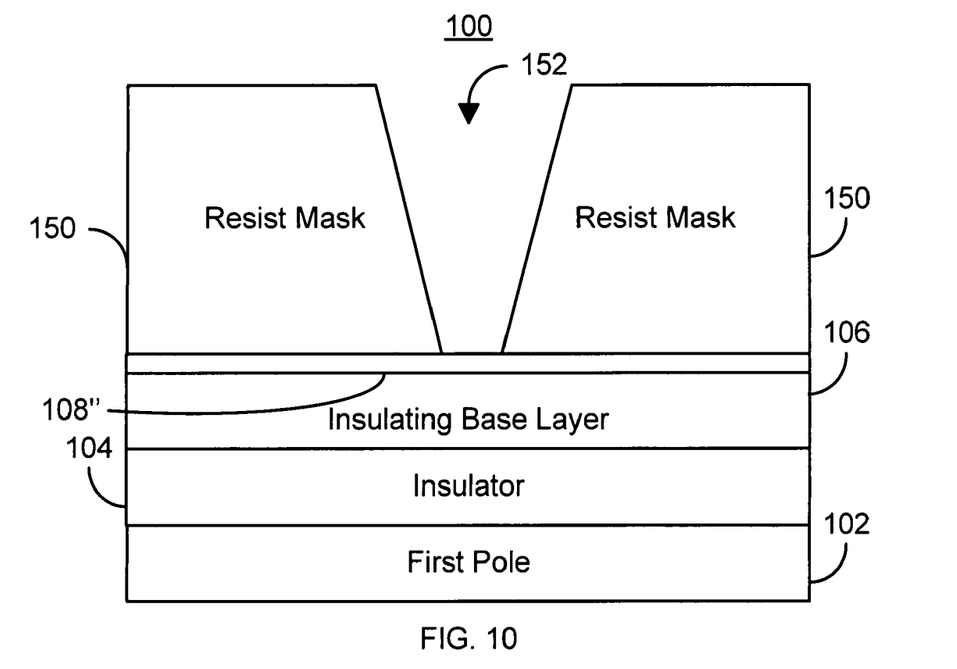

A mask for the PMR pole 110 is formed, via step 206. The mask is typically a photoresist mask having a trench that is substantially the same shape as the PMR pole 18. In a preferred embodiment, the mask is a photoresist mask. FIG. 10 depicts the PMR head 100 after step 206 is completed. Consequently, the resist mask 150 having a trench 152 therein is shown.

Figure 11:
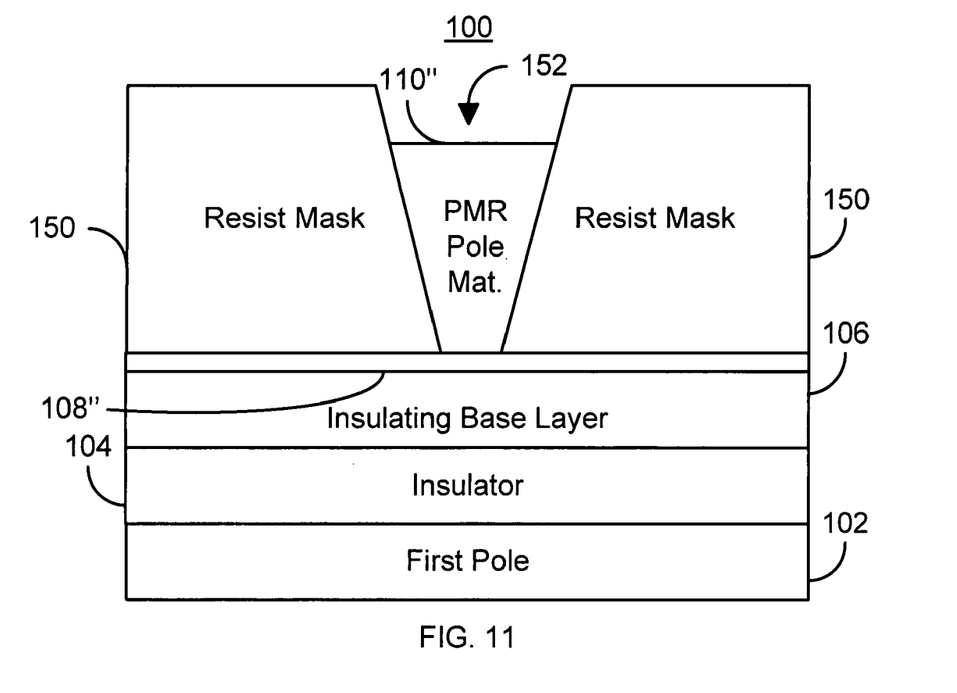

The trench 152 is refilled using the material for the PMR pole 110, via step 208. Generally, the material for the PMR pole 110 is plated in step 208. FIG. 11 depicts the PMR head 100 after the material 110″ for the PMR pole 110 is deposited. In some embodiments, the thickness of material 110″ deposited may be greater than the final height, h, of the PMR pole 110.

Figure 12:
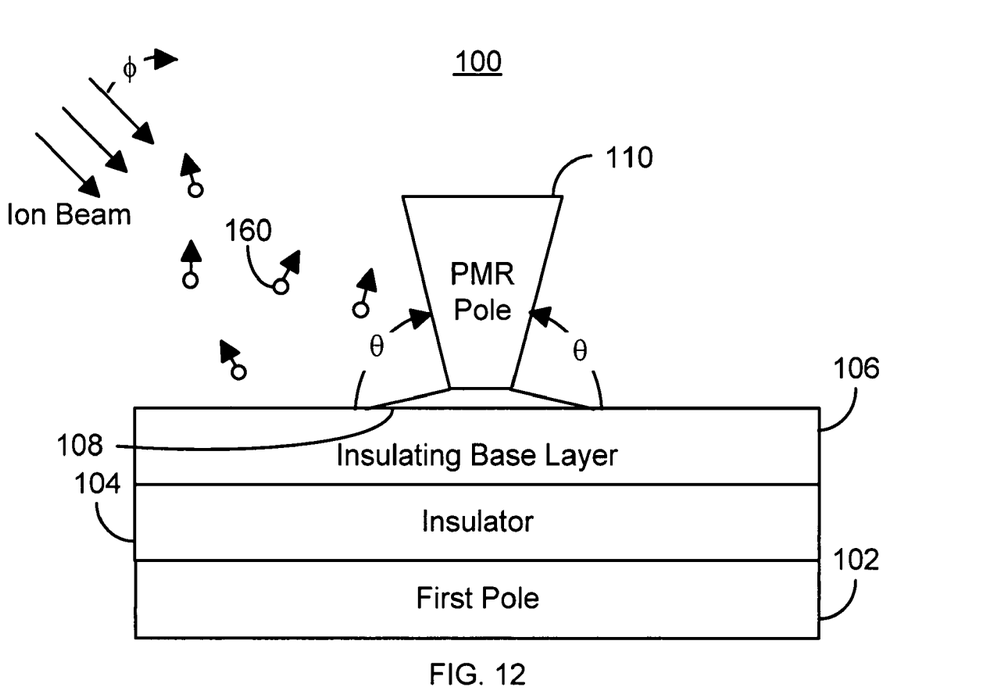

The mask 150 formed in step 206 is removed, via step 210. After removal of the mask 150, the PMR pole 18 is trimmed, via step 212. FIG. 12 depicts the PMR head 100 during step 212. Step 212 is preferably performed using an ion beam etch that is carried out at an angle. In one embodiment, the angle, φ, for the ion mill is at least forty degrees from normal to the surface. In a preferred embodiment, the angle, φ, for the ion mill is at least fifty degrees and not more than seventy degrees from normal to the surface. In addition to thinning the PMR pole 110, the trim performed in step 212 removes at least a portion of the nonmagnetic underlayer 108″ outside of the PMR pole 110. Because the underlayer 108 is nonmagnetic, not all of the exposed underlayer 108″ is removed. Consequently, FIG. 12 depicts the underlayer 108, which extends beyond the base of the PMR pole 110. In another embodiment, more of the nonmagnetic underlayer 108 may be removed. In such an embodiment, the remaining portion nonmagnetic underlayer 108″ may only be at the base of the PMR pole 110. Fabrication of the PMR head 100 is then completed, via step 214. Step 214 may include formation of the insulating layer 116, lapping of the conventional PMR pole 18 to define the pole thickness, formation of the shield gap 118, formation of top shield 120, formation of insulator 122, and other processes. Thus, the PMR head 100 depicted in FIGS. 5-6 or the PMR head 100' depicted in FIG. 7 may be provided.

Thus, the method 200 may provide the PMR heads 100 and 100'. Because of the use of the nonmagnetic underlayer 108/108'/108″, redeposition, particularly of the base layer 106/106' may be reduced. Furthermore, less of the material used for the PMR pole 110 may be consumed during the trim process. Consequently, less pole material 110″ may be deposited and the thickness of the mask 150 reduced. Consequently, better control of the geometry of the PMR pole 110/110', the track width, and the roughness of the sidewalls 112/112' and 114/114' may be achieved. Moreover, the materials used for the nonmagnetic underlayer 108/108'/108″ may be less subject to corrosion than a conventional magnetic underlayer 17. In addition, use of a nonmagnetic layer 108/108' between the pole/flux guide 103 and the PMR (write) pole 110/110' may reduce domain lockup. Thus, performance of the PMR head 100/100' may be enhanced. Because materials such as Ru, Ta, NiNb, Ti, and NiCr are used for the layer 108/108'/108″, these benefits may be achieved without substantially altering the PMR head 100/100' structure or fabrication process 200.

We claim:

1. A perpendicular magnetic recording (PMR) head comprising:
   a base layer having a first hardness with respect to a pole trim;
   a nonmagnetic metal underlayer comprising NiNb or Ta, the nonmagnetic metal underlayer having a second hardness with respect to the pole trim, the second hardness being less than the first hardness;
   a PMR pole on the nonmagnetic metal underlayer, the PMR pole having a top and a bottom, the top being wider than the bottom.

2. The PMR head of claim 1 wherein the PMR pole further has a pole width at a base of the PMR pole and wherein the nonmagnetic metal underlayer has a width at least as great as the pole width.

3. The PMR head of claim 1 wherein the nonmagnetic metal underlayer is a plated layer.

4. The PMR head of claim 1 wherein the nonmagnetic metal underlayer includes at least one sputtered layer.

5. The PMR head of claim 1 wherein the PMR pole includes at least one plated layer.

6. The PMR head of claim 1 wherein the base layer includes aluminum oxide.

7. The PMR head of claim 1 wherein the PMR pole includes a third hardness with respect to the pole trim, the second hardness being less than the first hardness and not less than the third hardness.

8. The PMR head of claim 7 wherein the second hardness is greater than the third hardness.

9. The PMR head of claim 1 wherein the PMR pole includes a third hardness with respect to the pole trim, the second hardness being less than the third hardness.

10. A perpendicular magnetic recording (PMR) head comprising:
    a base layer having a first hardness with respect to a pole trim;
    a nonmagnetic metal underlayer having a second hardness with respect to the pole trim and a width, the nonmagnetic metal underlayer comprising NiNb or Ta;
    a PMR pole on the nonmagnetic metal underlayer, the PMR pole having a top, a bottom, and a height, the top being wider than the bottom, the PMR pole having a third hardness with respect to the pole trim, the second hardness being between the first hardness and the third hardness, the width being at least as large as the pole height.

11. A method for providing a perpendicular magnetic recording (PMR) head comprising:
    providing a base layer having a first hardness with respect to a pole trim;
    providing a nonmagnetic metal underlayer comprising NiNb or Ta, the nonmagnetic metal underlayer having a second hardness with respect to the pole trim, the second hardness being less than the first hardness;
    providing a PMR pole on the nonmagnetic metal underlayer, the PMR pole having a top and a bottom, the top being wider than the bottom, the PMR pole providing including
    performing the pole trim for the PMR pole.

12. The method of claim 11 wherein the PMR pole providing further includes:
    providing a mask structure on the nonmagnetic metal underlayer, the resist structure having a trench therein;
    depositing at least one pole layer, a portion of the at least one pole layer residing in the trench;
    removing the resist structure, the portion of the at least one pole layer remaining; and
    wherein the pole trim further includes performing the pole trim on the portion of the at least one pole layer.

13. The method of claim 12 further comprising:
    providing an insulator for the PMR pole after the pole trim is performed and before further processing of the PMR head is performed.

14. The method of claim 12 wherein the at least one pole layer providing further includes:
    plating the at least one pole layer.

15. The method of claim 11 wherein the PMR head has a surface and wherein the pole trim further includes:

performing an ion mill at an angle of at least forty degrees from normal to the surface.

16. The method of claim 15 wherein the angle is at least forty degrees and not more than seventy degrees.

17. The method of claim 11 wherein the nonmagnetic metal underlayer providing further includes:
    plating the nonmagnetic underlay layer.

18. The method of claim 11 wherein the nonmagnetic metal underlayer providing further includes:
    sputtering the nonmagnetic underlay layer.

19. The method of claim 11 wherein the nonmagnetic metal underlayer providing further includes:
    providing a layer including at least one of Ru, Ta, NiNb, Ti, and NiCr.

20. The method of claim 11 wherein the nonmagnetic metal underlayer includes NiNb.

21. The method of claim 11 wherein the PMR pole providing further includes:
    providing the PMR pole having a pole width at a base of the PMR pole, the nonmagnetic metal underlayer having a final width at least as great as the pole width.

22. The method of claim 11 wherein the PMR head has a head width and wherein the width of the nonmagnetic metal underlayer has a width that is substantially the same as the head width.

23. The method of claim 11 wherein the PMR pole includes a third hardness with respect to the pole trim, the second hardness being less than the first hardness and not less than the third hardness.

24. The method of claim 23 wherein the second hardness is greater than the third hardness.

25. The method of claim 11 wherein the PMR pole includes a third hardness with respect to the pole trim, the second hardness being less than the third hardness.

* * * * *